US008200630B1

(12) United States Patent
Park et al.

(10) Patent No.: US 8,200,630 B1
(45) Date of Patent: Jun. 12, 2012

(54) CLIENT DATA RETRIEVAL IN A CLUSTERED COMPUTING NETWORK

(75) Inventors: Collin Park, Redwood City, CA (US); Trond Myklebust, Ann Arbor, MI (US); Pete Wyckoff, Durham, NC (US)

(73) Assignee: NetApp, Inc., Sunnyvale, CA (US)

( * ) Notice: Subject to any disclaimer, the term of this patent is extended or adjusted under 35 U.S.C. 154(b) by 310 days.

(21) Appl. No.: 12/543,028

(22) Filed: Aug. 18, 2009

(51) Int. Cl.
*G06F 7/02* (2006.01)
(52) U.S. Cl. ........................................ 707/638; 707/639
(58) Field of Classification Search .................. 707/638, 707/639, 778
See application file for complete search history.

(56) References Cited

U.S. PATENT DOCUMENTS

| | | | | |
|---|---|---|---|---|
| 6,390,920 | B1 * | 5/2002 | Infiesto et al. | 463/42 |
| 7,747,584 | B1 * | 6/2010 | Jernigan, IV | 707/692 |
| 7,814,149 | B1 * | 10/2010 | Stringham | 709/203 |
| 7,882,068 | B2 * | 2/2011 | Schack et al. | 707/639 |
| 2008/0005196 | A1 * | 1/2008 | Beck | 707/203 |

OTHER PUBLICATIONS

Osuna, Alex, "An Introduction to FlexClone Volumes", IBM Corp. 2006, http://www.redbooks.ibm.com/redpapers/pdfs/redp4133.pdf.
Edwards, et al., "FlexVol: Flexible, Efficient File Volume Virtualization in WAFL", Appears in Proceedings of the 2008 USENIX Annual Technical Conference. Boston, MA. Jun. 2008, http://www.usenix.org/event/usenix08/tech/full_papers/edwards/edwards_html/index.html.
"Volume (computing)", pp. 1-4, http://en.wikipedia.org/wiki/Volume_(computing).

* cited by examiner

*Primary Examiner* — James Trujillo
*Assistant Examiner* — Soheila Davanlou
(74) *Attorney, Agent, or Firm* — Cooper Legal Group, LLC (57) ABSTRACT

One or more aspects of the disclosure relate to techniques for accessing a file stored in a clustered computing network, where the file is stored in the clustered computing network in a plurality of related volumes that stem from a particular (e.g., parent) volume. In the method, a request to retrieve the file from the particular volume is received at the client. The client then determines whether the file is stored in a client memory so as to be identified with the particular volume. If the file is not stored in the client memory so as to be identified with the particular volume, then the file is retrieved from a different but related volume.

22 Claims, 10 Drawing Sheets

CLIENT DATA RETRIEVAL IN A CLUSTERED COMPUTING NETWORK

BACKGROUND

In our modern communication age, business entities and consumers are storing an ever increasing amount of digitized data. For example, many entities are in the process of digitizing their business records and/or other data. Similarly, web based service providers generally engage in transactions that are primarily digital in nature. Thus, techniques and mechanisms that facilitate efficient and cost effective storage of vast amounts of digital data are being implemented.

Clustered computing networks provide users with an ability to quickly and efficiently manage vast amounts of digital data in a cost effective manner. In particular, clustered computing networks offer users the ability to store and access multiple versions of data from a parent volume (e.g., a traditional or flexible volume). For example, from a parent volume, users can generate a child volume (e.g., a flexible copy of the parent volume, where the flexible copy is based on a snapshot copy of the parent volume at some instant in time). When a plurality of child volumes ("sibling volumes") are initially generated from the same snapshot copy, the files in the sibling volumes are initially bit-for-bit replicas of each other and of the snapshot copy. The files in the sibling volumes remain bit-for-bit replicas until a file is modified on one or more of these sibling volumes.

In addition, subsequent snapshot copies can be created based on child volumes, thereby generating "grandchild" volumes, wherein any given file within a grandchild volume can remain a bit-for-bit replica of the parent and child volumes until a change is made to a file on one of the volumes. In this manner, corresponding files between parent, child, grandchild, great-grandchild, cousin, and possibly between all relatives in a hierarchy of related volumes can be bit-for-bit replicas of one another, although these corresponding files will tend to diverge over time as changes are made to the files on the volumes.

When a first volume and a second volume are related in this way (e.g., a first volume is a parent volume and a second volume is a child volume (or vice versa)), a first application on the client (or a first instance of the first application) can initially access a file from the first volume (e.g., the parent volume). The first application can cause the file to be locally cached as one or more data blocks stored in a memory in the client (e.g., a client-side cache). At this time within the client memory, the data blocks of the file are associated with a first volume identifier (e.g., an inode number, generation number, and/or file system identifier (FSID)), which corresponds to the first volume.

A second application on the client (or a second instance of the first application) can likewise access the same file, but from the second volume (e.g., the child volume) in the clustered computing network (e.g., due to preprogramming in the second application indicating that the file is available from the second volume). Like the first application, the second application can cause the file to be locally cached as one or more data blocks stored in the client memory. Thus, at this time, a second copy of the data blocks for the file can be stored in client memory but associated with a second volume identifier. Alternatively, a single copy of the data blocks of the file can be stored in the client memory but associated with both first and second volume identifiers.

It can be appreciated that the client device may once again need this file for subsequent operations. However, because the client memory has only limited space, at some subsequent time the file may no longer be stored in the client memory with both the first and second volume identifiers. This can cause client-side caching inefficiencies. For example, if the first application has not accessed the file in the first volume for an extended time period, the file in the first volume may be marked as "stale" in the client memory. Thus, where two copies of the data blocks of the file are stored in client memory (e.g., one copy associated with the first volume identifier and the other copy associated with the second volume identifier), this may cause the copy of the data blocks associated with the first volume identifier to be disposed of or overwritten in client memory. Alternatively, where a single copy of the data blocks are stored in the client memory but associated with both first and second volume identifiers, this may cause the file's data blocks to be disassociated from the first volume identifier in client memory.

In this instance, if the first application were to request the file according to the first volume identifier after the extended time period, the file would no longer appear as locally available since the file is no longer associated with the first volume identifier in client memory. However, unbeknownst to the first application, the data blocks of the file may still reside in the client memory, albeit associated with only the second (different) volume identifier. Once again, this is because the file as stored in the first and second related volumes tends to be a bit-for-bit replica in the volumes until the file is modified in one of the volumes.

Thus, if the first application were to request the file according to the first volume identifier in this example, the client will send a request to retrieve the file from the first volume in the clustered computing network, rather than retrieving it from the client memory. It can be appreciated that this is an inefficient operation since it requires more resources to go out and fetch data from an external source than to obtain it locally from the client (e.g., from the client-side cache). Therefore, the inventors have appreciated that previous solutions unduly reduce the cache-hit ratio for the client, and correspondingly reduce system performance.

SUMMARY

Aspects of the present disclosure propose to improve this cache-hit ratio, and thus the application performance, by changing how a client identifies files that are the same within its memory.

The present disclosure relates to techniques by which a client can efficiently retrieve files while limiting unnecessary requests to a clustered computing network. In one embodiment, the client accesses files from over a clustered computing network and caches these files in client memory. As the files are cached, they are stored in the client memory so as to be associated with respective volume identifiers. For example, a first version of a file can be associated with a first volume having a first volume identifier, and a second version of the file can be associated with a second volume having a second volume identifier. In instances where the first and second volumes are related volumes (e.g., a flexible copy volume based on a snapshot copy volume), the first and second versions of the file can contain at least substantially the same data blocks.

If a requesting module (e.g., an application) in the client subsequently desires the first version of the file, the requesting module can send a request for the first version of the file to the client OS. In previous implementations, if the client OS determines that the first version of the file is not stored in the client memory, the client would make a request from the external clustered computing network. However, in the present disclosure, before an external request is made, the client OS further analyzes the client memory to determine if the second version of the file is stored in client memory. Upon finding that a second version of the file is available in the client memory (albeit with a different volume identifier), the client OS can retrieve the second version of the file from client memory (e.g. since there is little to no difference between the data blocks for the first and second versions).

In this manner, the inventive techniques attempt to avoid sending requests from the client to the storage system in situations where the client memory already has a desired file, even if associated with a different volume identifier. This functionality improves the speed at which the client can retrieve a file, because it saves the time required for retrieval of the file by the clustered computing network. This functionality also tends to improve performance for the clustered computing network by limiting the number of client requests that are serviced.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Some examples of the claimed subject matter are now described with reference to the drawings, where like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. Nothing in this detailed description is admitted as prior art.

While existing techniques allow a client to retrieve data in a reliable manner, until now clients have been unable to efficiently make use of substantially redundant metadata and data blocks of files that are associated with different volumes and/or file systems. Accordingly, in one or more aspects of the present disclosure, a client desiring data from a particular volume analyzes data in its client memory. If the data in its memory is from a different volume than desired but still contains the same data, the client retrieves the data from its memory without making a request (for data blocks of files) from the clustered computing network. In this manner, the client can improve system performance.

Figure 1:
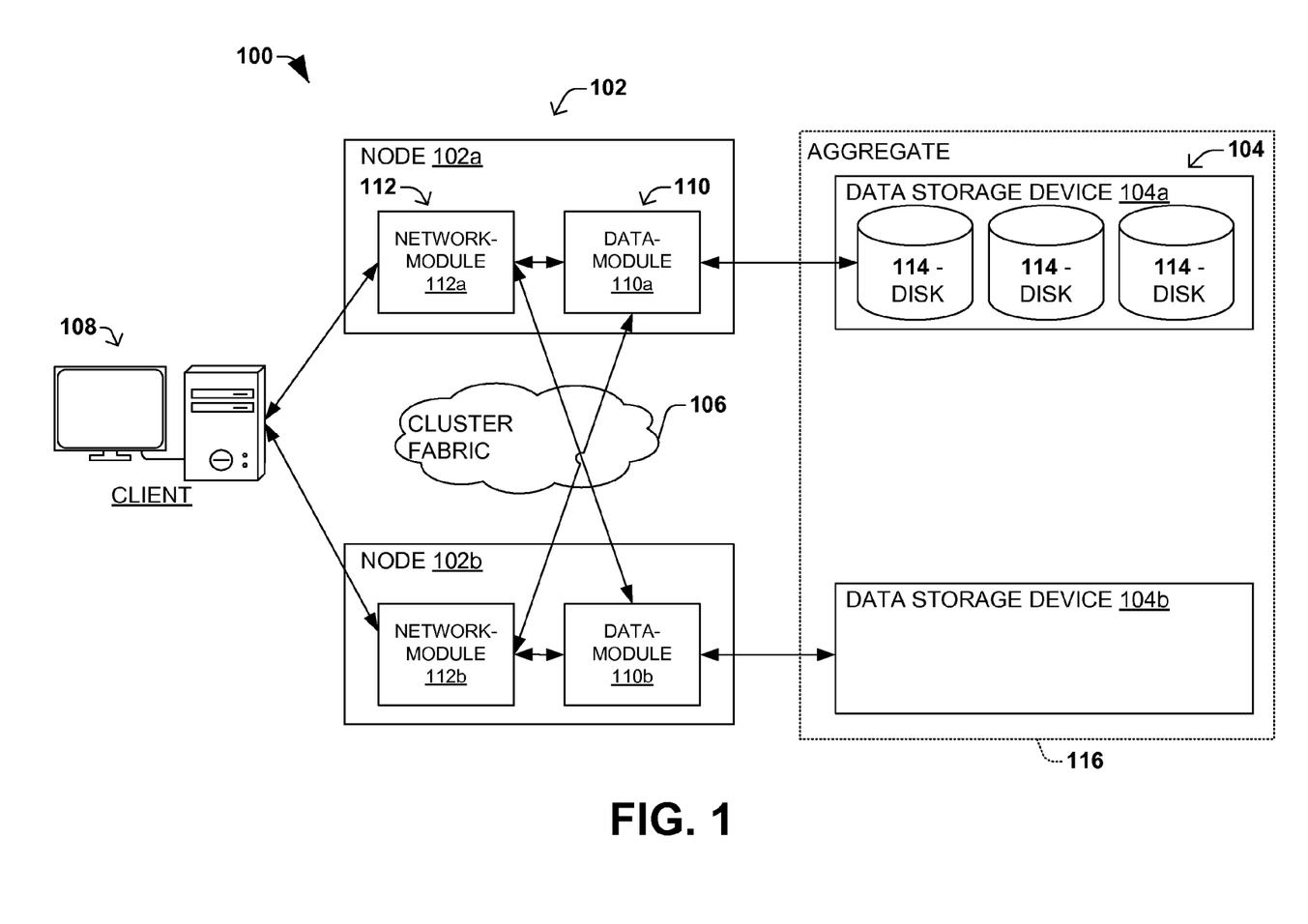
FIG. 1 is an illustration of an embodiment of a clustered computing network.

To provide a context for several features of the disclosure herein, FIG. 1 illustrates a clustered computing network 100 and FIGS. 2-6 illustrate data structures and several examples of related volumes that may be employed in the clustered computing network to store and manage data. After walking through the clustered computing network of FIG. 1 and associated data structures of FIGS. 2-6, the disclosure sets forth several improved techniques with regards to the remaining figures and their accompanying description.

Turning now to FIG. 1, one can see an embodiment of a clustered computing network 100. The clustered computing network 100 includes a plurality of nodes 102 (e.g., first and second nodes 102a, 102b) that are coupled to respective data storage devices 104 (e.g., first and second data storage devices 104a, 104b) as well as a cluster fabric 106. These components are operably coupled to provide one or more clients 108 with access to data stored in the clustered computing network 100. It should be appreciated that, for purposes of simplicity of clarity, the embodiment 100 depicts only first and second nodes 102a, 102b, however, clustered computing networks often include many more nodes, where respective nodes can be coupled to one or more respective data storage devices 104 as well as to the other nodes. It should also be appreciated that a clustered computing network, as the phrase is used herein, may contain a single node 102a rather than a plurality of nodes 102a, 102b, etc.

As illustrated, respective nodes 102 can comprise one or more data module(s) 110 and one or more network module(s) 112. A data module within a given node enables that node to connect to one or more respective data storage devices 104 coupled to the node. For example, in the illustrated embodiment, a first data module 110a couples the first node 102a to a first data storage device 104a, where the first data storage device 104a includes a disk array made up of a number of disks 114. Similarly, a second data module 110b couples the second node 102b to a second data storage device 104b, where the second data storage device 104b can include some other type of memory device, such as one or more flash storage device(s), for example (and/or a number of disks (not shown)).

Often, data modules 110 communicate with the data storage devices 104 according to a storage area network (SAN) protocol, such as Small Computer System Interface (SCSI) or Fiber Channel Protocol (FCP), for example. Thus, as seen from an operating system on a node, the data storage devices 104 appear as locally attached to the operating system. In this manner, the nodes 102 typically access data blocks through the operating system, rather than expressly requesting abstract files.

In addition to the nodes 102 including data modules 110, the nodes 102 also include network modules 112 for connecting with one or more other nodes through the cluster fabric 106. For example, in FIG. 1, first network module 112a of first node 102a can access second data storage device 104b by sending a request through second data module 110b of second node 102b.

The network modules 112 also allow the respective nodes 102 to carry out communication with one or more clients 108. For example, the client 108 may request the services of the clustered computing network 100 through first node 102a (e.g., acting as a server), after which the first node 102a may return the results of the requested services to the client 108. The network modules 112 and client 108 can exchange packets using Network Attached Storage (NAS) protocols, such as a Common Internet File System (CIFS) protocol or a Network File System (NFS) protocol, whereby a client requests abstract files rather than data blocks over the network. For example, a client may request an abstract file by providing a file identifier (e.g., inode number and generation number) along with a volume identifier (e.g., file system identifier (FSID)), which uniquely identifies a file as belonging to a particular volume.

An operating system (not illustrated) is installed on the nodes 102 and manages communications between the nodes 102, thereby allowing the nodes 102 to respond to client requests to manage data on the data storage devices 104 in accordance with these client requests. In many instances, the operating system can make it so the multiple data storage devices 104 act as a single logical data storage area 116, which may also be referred to as an "aggregate." Although not explicitly illustrated in FIG. 1, multiple aggregates may also be present.

The operating system can often establish one or more file systems and/or volumes on the clustered computing network 100, where a file system includes software code and data structures that implement a persistent hierarchical namespace of files and directories. When a new data storage device 104 is added to the system, the operating system is informed where in the existing directory tree any new files associated with the new data storage device are to be stored. This is called "mounting" a file system.

Figure 2:
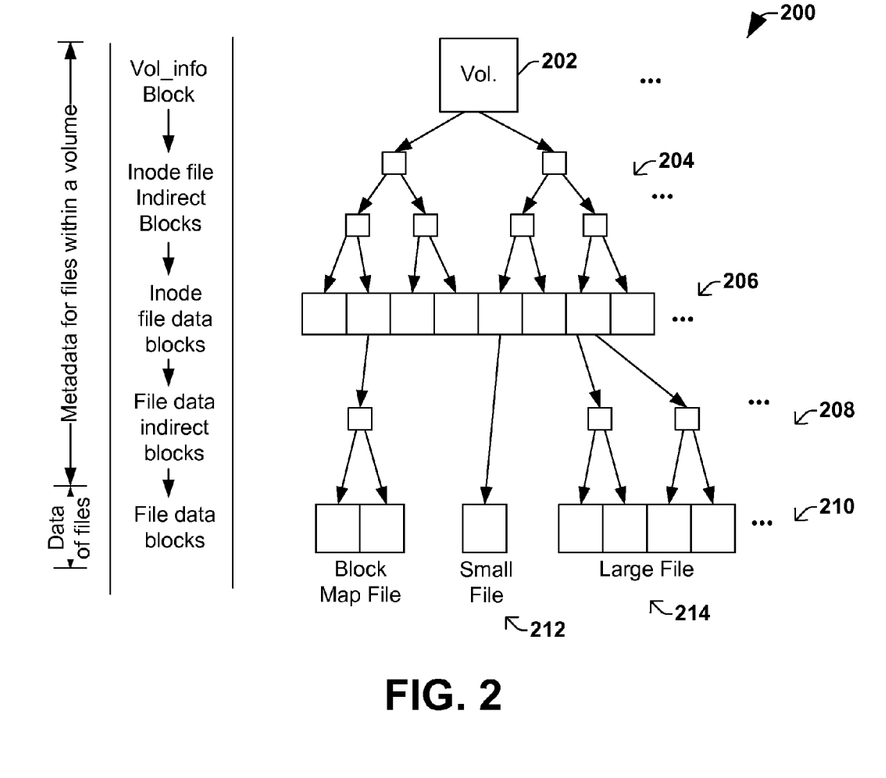
FIG. 2 is an illustration of an embodiment of data structures that can be used to store volumes of one or more files on a clustered computing network.

Whatever the underlying physical configuration within this clustered computing network, data can be stored in files arranged within the filesystem(s) according to volumes, which are logical storage areas. FIG. 2 illustrates one example of data structures 200 by which users can organize one or more files according to a given volume. When multiple volumes are established in the clustered computing network, the volumes can be associated with respective volume identifiers, such as file system identifiers (FSIDs), which can be 32-bits in length in one example.

As illustrated in FIG. 2, the data structures 200 for a volume are rooted at a vol_info block 202, which may be analogous to a superblock in other file systems. The vol_info block 202 contains an inode 204 that directly or indirectly describes an inode file data block 206. An inode file data block contains per-file metadata and pointers 208 that directly or indirectly point to data blocks 210 of files within the volume. For example, an inode file includes information about the location, size, creation/modification/access times, ownership, access attributes of, and links to the files within the volume. Thus, inodes do not contain file names per se, but only file metadata about the files. For a small file (e.g., 212), a corresponding inode can point directly to the file's data blocks. For a large file (e.g., large file 214), a corresponding inode can point to trees of indirect blocks that can, in turn point to the file's data blocks. By utilizing these data structures, the operating system can find data blocks or metadata for a file within a given volume. The data blocks 210 of a volume may be statically allocated to a data storage device or disk (e.g., 104a in FIG. 1), which may be referred to as a traditional or physical volume, or may be spread over an aggregate (e.g., 116 in FIG. 1), which may be referred to as a flexible or virtual volume.

It should be appreciated that the present technology relies upon metadata such as typically are stored in inode structures, which structures may reside in an inode file as described in one implementation. The mention of "inode structures" or their description as residing in an inode file, are intended to be illustrative. The present technology does not require actual inode structures (other data structures may provide similar metadata for example), nor such location for inode structures (inode structures may reside for example in a possibly larger superblock). Indeed, the present technology does not require that every single feature of an "inode structure" be implemented within the clustered computing network.

Figure 5:
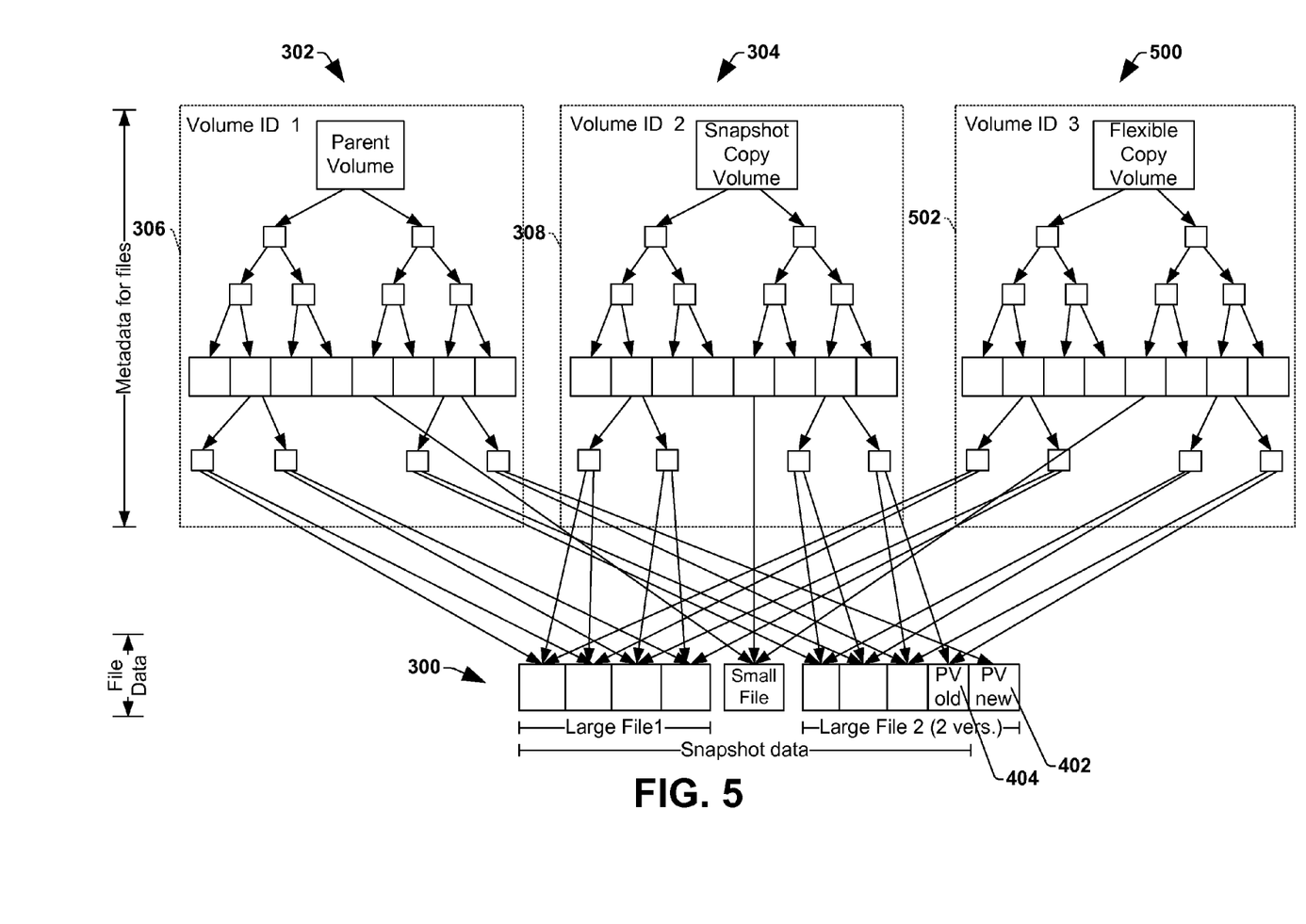
FIG. 5 is an illustration of an embodiment of a flexible copy that is based on a snapshot copy, where the snapshot copy is based on a parent volume.
Figure 6:
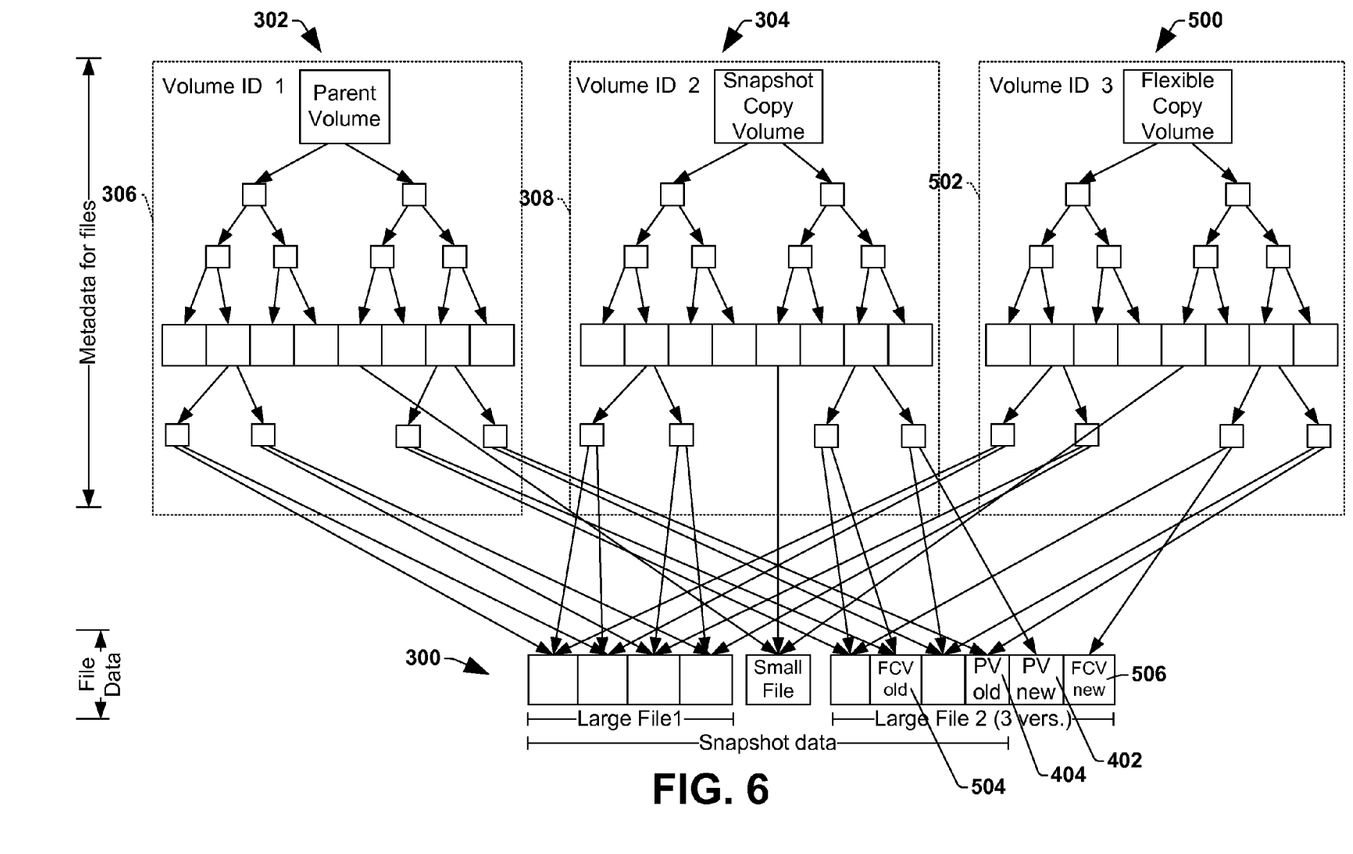
FIG. 6 is an illustration of an embodiment of a flexible copy that is based on a snapshot copy, where the flexible copy has been modified after its creation.

By using these or other data structures, the clustered computing network 100 offers users the ability to generate a series of related volumes (e.g., parent volume, child volumes, grandchild volumes). For example, FIGS. 3-4 below illustrate an example where related volumes include a parent volume having a child volume that is a snapshot copy; while FIGS. 5-6 illustrate another example where related volumes include a parent volume having child volumes including a snapshot copy and a flexible copy. As can be appreciated as described in these examples below, related volumes may at times store the same files as data blocks that are bit-for bit replicas. While these related volumes may include substantially similar metadata that points to these data blocks, the volumes often include different volume identifiers, which can lead to client cache misses, absent countermeasures.

Figure 3:
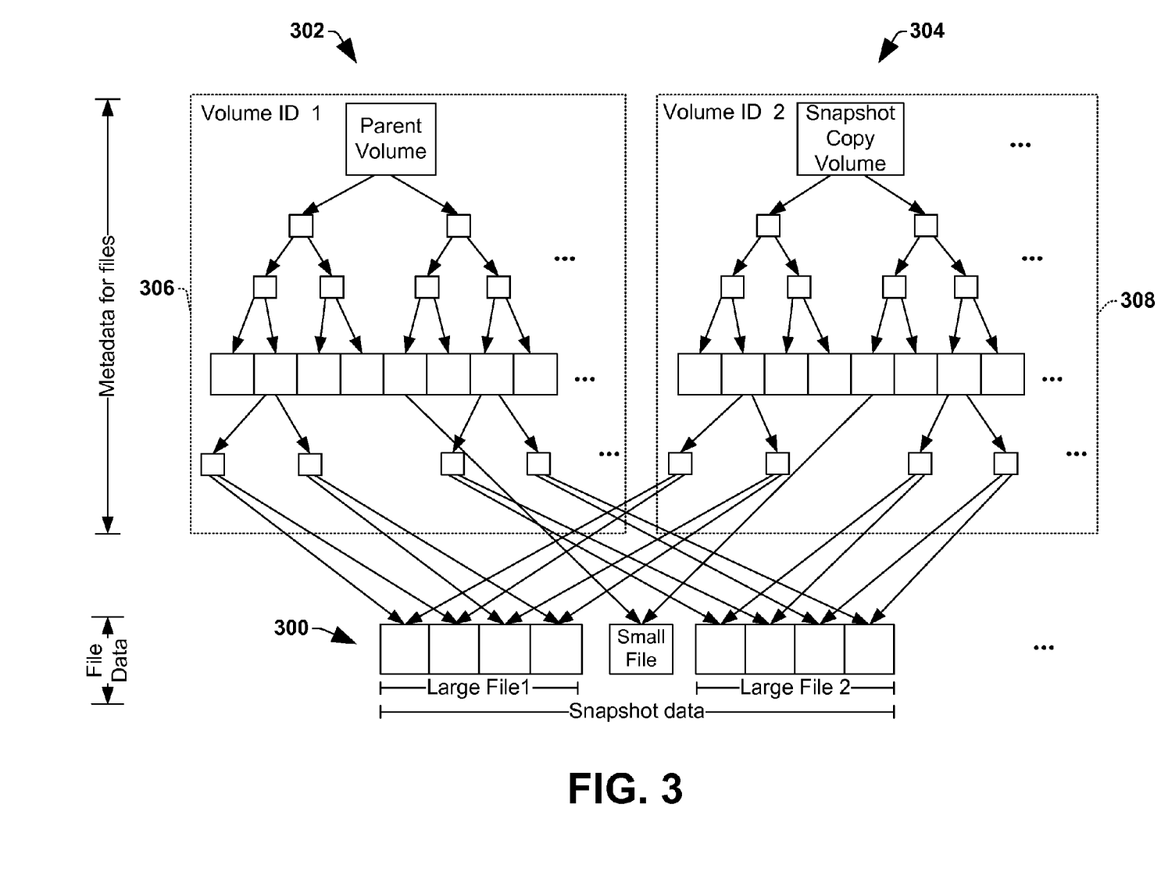
FIG. 3 is an illustration of an embodiment of a snapshot copy that is based on a parent volume.
Figure 4:
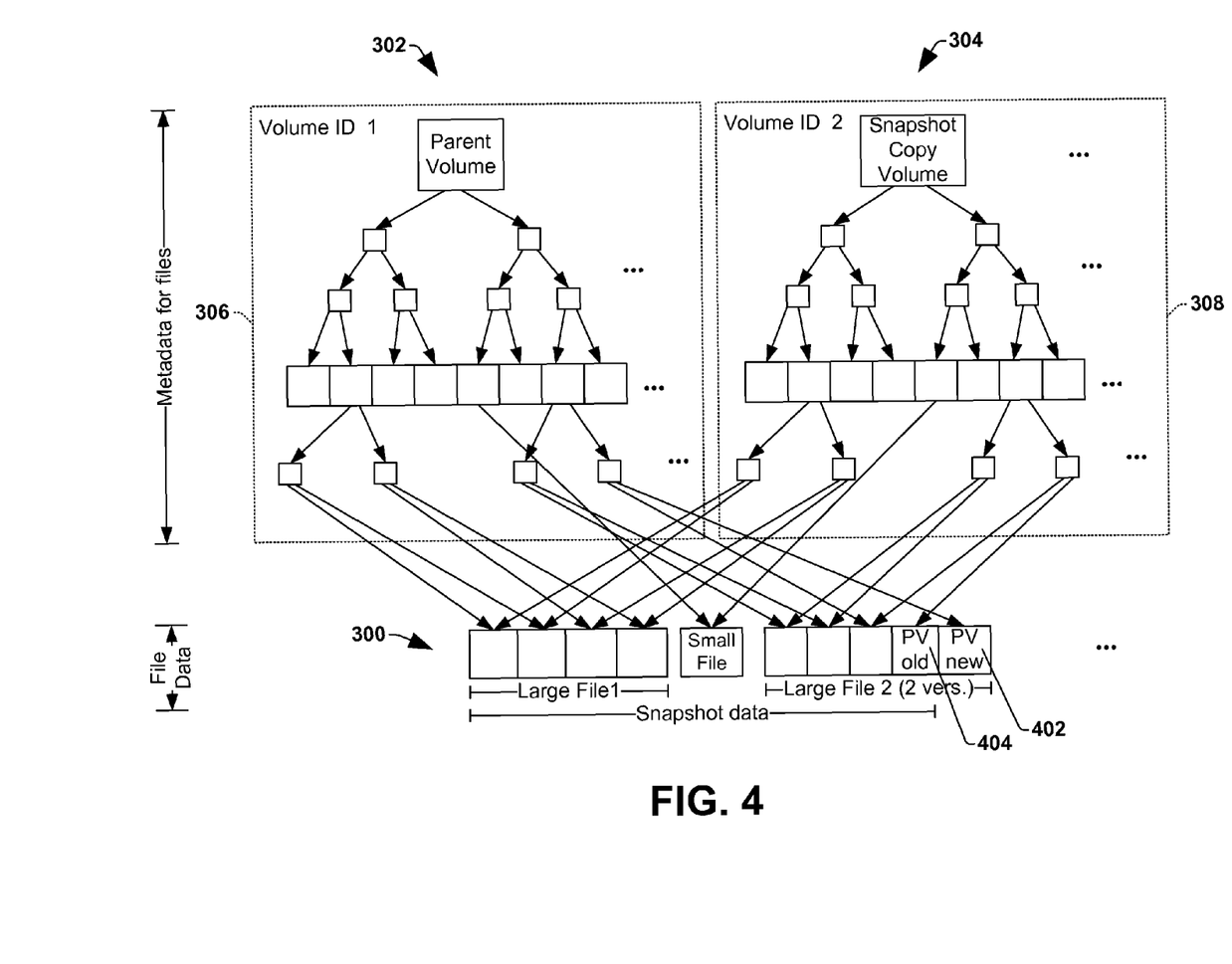
FIG. 4 is an illustration of an embodiment of a snapshot copy that is based on a parent volume, where the parent volume has been modified after the snapshot copy has been taken.

Turning now to FIGS. 3-4, one can see an example where related volumes (which include a parent volume 302 and a snapshot copy 304) point to the same data blocks 300, which can be stored in a data storage device or over an aggregate. Typically, the parent volume 302 can be readable and writeable, while the snapshot copy volume 304 is read-only.

In FIG. 3, the parent volume 302 includes a first instantiation of metadata 306 (e.g., volume_info block and inodes as illustrated in FIG. 2) that points to the data blocks 300 which make up the files stored in the parent volume. At some subsequent time after the parent volume is created, the operating system can create the snapshot copy volume 304 by generating a second instantiation of metadata 308 that also points to the data blocks 300 which make up the files stored in the parent volume. Although separate instantiations of metadata 306, 308 are illustrated in this example for conceptual purposes, it is to be appreciated that often the metadata for the parent volume and snapshot copy are substantially the same metadata, and not completely separate instantiations. Because the metadata typically has a relatively small data size (e.g., the size of the metadata can be less than or equal to about 1% of the size of the data blocks to which it points), it is quicker and takes up less memory space to setup the snapshot copy volume 304 with modified metadata 308 rather than actually copying all of the data blocks of the parent volume 302 to the snapshot copy volume 304.

FIG. 4 illustrates how a large file (Large File 2) can be modified within the parent volume, such that the parent volume and snapshot copies contain two independent versions of the large file. As illustrated, the parent volume metadata 306 now points to a new data block 402 associated with the modified large file, rather than pointing to an old data block 404 associated with the old version of the large file. The end result is that the snapshot copy metadata 308 still points to the data blocks of the previous version of the parent volume, thereby retaining a "snapshot" of the parent volume at the time the snapshot was initially created.

FIG. 5 illustrates operation of another example of related volumes that include a flexible copy volume 500, which may also be referred to in some contexts as a "FlexClone." As illustrated, the operating system creates the flexible copy volume 500 by creating a third instantiation of metadata 502, which corresponds to the metadata 308 of the snapshot copy volume 304. Again, although separate instantiations of metadata 306, 308, 502 are illustrated in this example for conceptual purposes, it is to be appreciated that often the metadata for the related volumes are substantially the same metadata, and not completely separate instantiations. FIG. 5 clearly illustrates that the metadata 502 of the flexible copy 500 points to the same data blocks as the snapshot copy volume 304. Unlike the snapshot copy volume 304, however, the flexible copy 500 is readable and writable.

Often, the flexible copy 500 can be used for testing purposes, prototype purposes, and the like, because it can be altered without affecting files on the parent volume 302. In some respects, a snapshot copy 304 can be thought of a "hardcopy" of the parent volume 302 at a given time, and the flexible copy 500 can be thought of as a writeable layer that sits on the surface of a snapshot volume 304.

Thus, as is illustrated in FIG. 6, the operating system can subsequently alter data blocks of files within the flexible copy 500 independent of the snapshot copy 304 and/or parent volume 302. For example, in FIG. 6, at some later time after the flexible copy 500 is created, the metadata 502 of the flexible copy is altered to point to new data block 506, while the snapshot copy metadata 308 still points to the old data block 504.

Notably, in the example of FIG. 6, some corresponding files (e.g., data blocks labeled as "Large File 1") are bit-for-bit replicas in each of the parent volume 302, the snapshot copy 304, and the flexible copy 500. In other words, Large File 1 contains the same bits as viewed from the parent volume, the snapshot copy, and the flexible copy volume. However, other corresponding files (e.g., data blocks labeled as "Large File 2") have different data blocks depending on which related volume is considered. In other words, Large File 2 contains different bits as viewed from parent volume, the snapshot copy, and the flexible volume copy.

It will be appreciated that although FIG. 6 illustrates only a single parent volume having individual snapshot and flexible copy volumes associated therewith, related volumes can be extended to include multiple generations (e.g., grandchild volumes, cousin volumes, great-grand-child volumes), all of which can be derived from one or more parent volumes.

While this general manner of generating related volumes that share substantial amounts of metadata and data blocks is sufficient in many respects, the inventors have appreciated that existing client implementations do not adequately account for related volumes. In particular, existing client implementations do not take into account that some files on a first volume are bit-for-bit replicas of corresponding files as viewed from another volume. Thus, the inventors have devised techniques in which a client, in response to a request for a file of a particular volume, can analyze data in its memory to determine whether the file is associated with the particular volume in its memory. If the file is not associated with the particular volume in its memory, the client can also determine whether the file is associated with a related volume in which the file is stored as a bit-for-bit replica of the file of the requested volume. Because this tends to limit cache misses at the client, these techniques can enable more efficient retrieval of data than previously achievable.

The client may periodically request a file's metadata from the clustered computing network in order to verify whether such metadata have changed since the file's data blocks were last cached in the client's memory. This information is useful to the client in determining whether the file's data blocks have changed in the clustered computing network since the file was last cached on the client.

Figure 7:
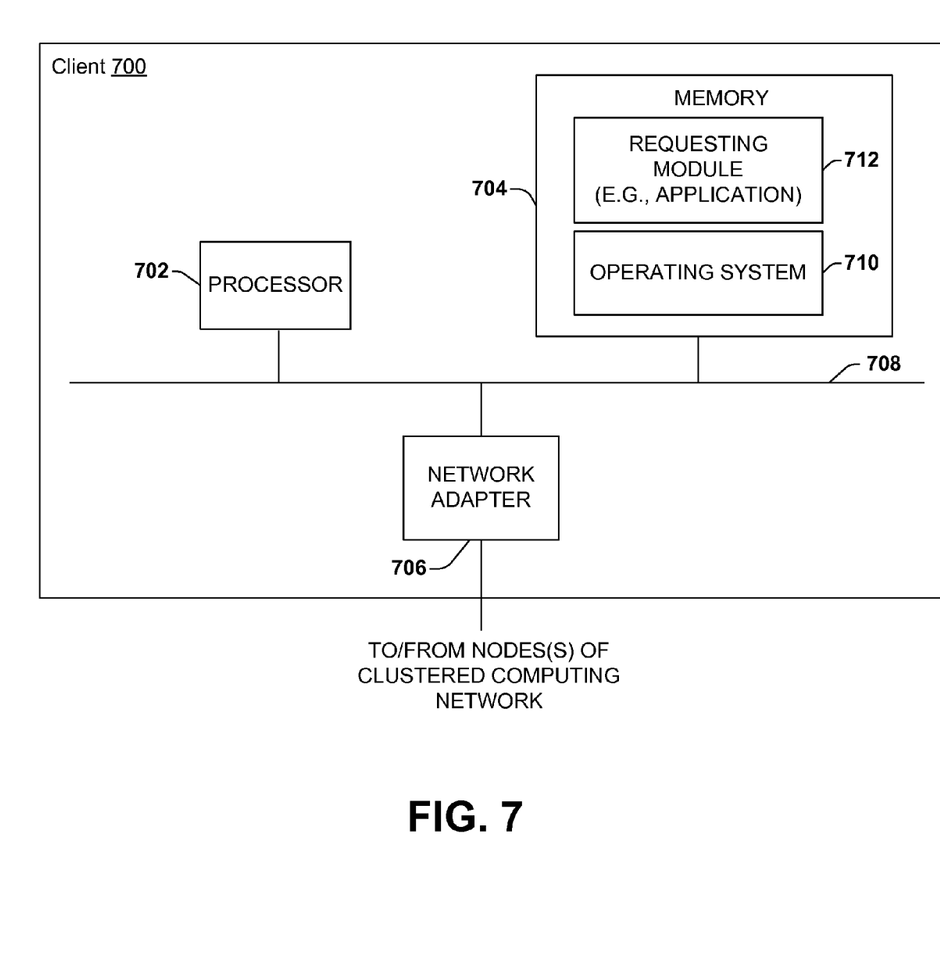
FIG. 7 is illustration of a client that is adapted to connect to a clustered computing network.

Turning now to FIG. 7, one can see a block diagram of one embodiment of a client 700 in accordance with one or more aspects of the disclosure. The client 700 includes a processor 702, a client memory 704 (e.g., cache memory and/or main memory), and a network adapter 706. The network adapter 706, which may be a wireless and/or wireline adapter, can include mechanical, electrical and/or signaling circuitry to connect the client 700 to a node of a clustered computing network (e.g., clustered computing network 100). These components can be interconnected by a system bus 708.

An operating system 710 is included on the client 700. The operating system 710 can include processor instructions and data structures that when loaded into the processor 702 effectuate the functionality described herein. For example, the operating system can manage the client memory 704 to lookup data blocks corresponding to one or more files stored in the memory. These files can be stored in related volumes (e.g., as described in FIGS. 2-6 above).

When a requesting module 712, such as an application module, requests a file from a particular volume, the operating system 710 can attempt to retrieve the file from the client memory 704 in various manners before requesting the file from the clustered computing network.

Figure 8:
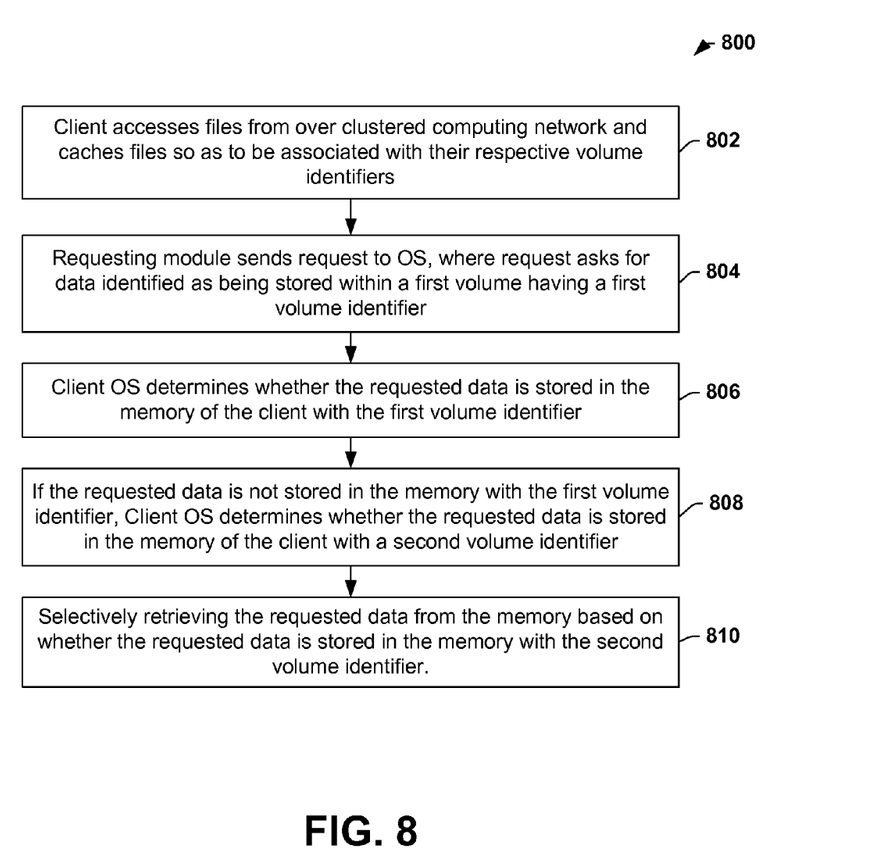
FIG. 8 is an illustration of a flow chart that illustrates a method in accordance with one or more aspects of this disclosure.
Figure 9:
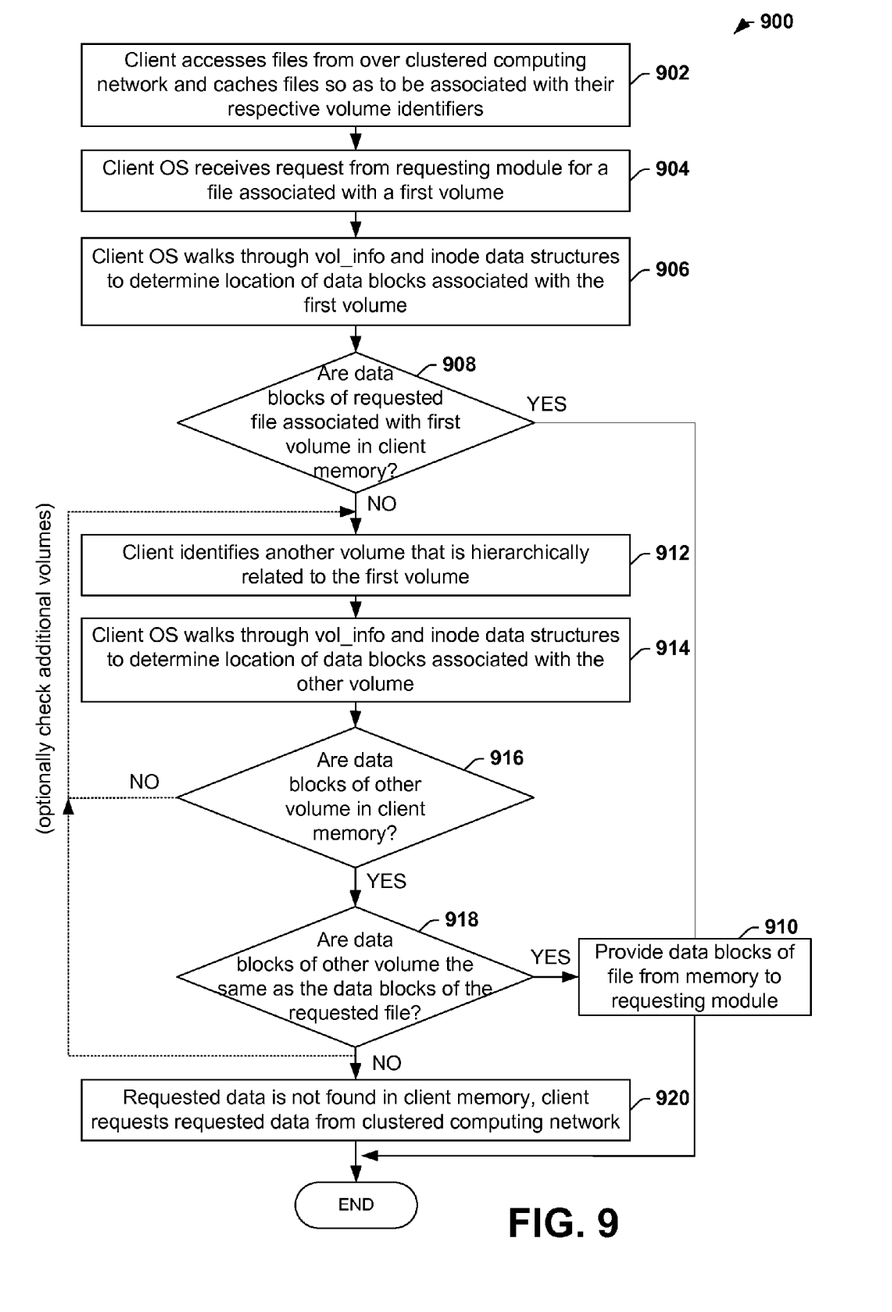
FIG. 9 is an illustration of a flow chart that illustrates a method in accordance with one or more aspects of this disclosure.

During operation, the client can perform the methods described herein, which facilitate access to files stored in a clustered computing network in a manner that tends to limit client cache-misses. FIG. 8 illustrates a data recovery method 800 that is more general in some respects, and FIG. 9 illustrates a more particular methodology 900. While these methods are illustrated and described below as a series of acts or events, the present disclosure is not limited by the illustrated ordering of such acts or events. For example, some acts may occur in different orders and/or concurrently with other acts or events apart from those illustrated and/or described herein. In addition, not all illustrated acts may be required. Further, one or more of the acts depicted herein may be carried out in one or more separate acts or phases.

Referring now to FIG. 8, one can see a method 800 of accessing a file stored a clustered computing network, where the file is stored in the clustered computing network in a plurality of related volumes that stem from a parent volume. The related volumes can have respective volume identifiers that are different for respective related volumes. See e.g., FIG. 6 (illustrating three related volumes).

During 802 in FIG. 8, the client accesses files from over clustered computing network and caches these files in the client memory. When a file is cached, it is stored in the client memory so as to be associated with its respective volume identifier. If some predetermined relationship is met (e.g., client memory is full or threshold time value is exceeded), old data stored in the client memory may be dumped or overwritten.

At 804, a requesting module in the client sends a request to the client OS. This request specifies a file that is identified as being stored within a first volume having a first volume identifier.

In 806, the client OS determines whether the requested file is stored in the client memory along with the first volume identifier.

In 808, if the requested file is not stored in the client memory with the first volume identifier, then the client OS determines whether the requested file is stored in the memory of the client with a second volume identifier. The second volume identifier corresponds to a volume that is related to the first volume. For example, the second volume could be a child volume, grandchild volume, cousin volume, or some other related volume relative to the first volume.

In 810, the client selectively retrieves the requested file from the memory based on whether the requested data is stored in the memory with the second volume identifier.

FIG. 9 illustrates another methodology 900. At 902, the client accesses files from over clustered computing network and caches files in the client memory. When a file is cached, it is stored in the client memory so as to be associated with its respective volume identifier.

At 904, the client OS receives a request from the requesting module for a file associated with a first volume.

At 906, the client queries its internal data structures to determine its in-memory location for data blocks associated with the requested file.

At 908, a determination is made whether data blocks of the requested file of the first volume are stored in the client memory. This process of determination may involve a request for metadata from the clustered computing network (e.g., to determine whether such metadata have changed since that file was last cached).

If the data blocks of the requested file of the first volume are stored in the client memory ("YES" at 908), then the method 900 proceeds to 910 where data blocks of the file are provided from the client memory to the requesting module. This typically occurs without the client making a request for file data blocks from the clustered computing network.

If, however, the data blocks of the requested file of the first volume are not stored in client memory ("NO" at 910), then the method proceeds to 912. In 912, the client identifies another volume (e.g., a second volume) that is hierarchically related to the first volume but has a different volume identifier (e.g., a second volume identifier).

At 914, the client OS walks through its internal data structures to determines its in-memory location for data blocks of the file that are associated with the other volume (e.g., second volume).

If the data blocks of the other volume are not in client memory ("NO" at 916), the client can return to 912 to identify if there are other related volumes stemming from the parent volume.

On the other hand, if the data blocks of the other volume are in client memory ("YES" at 916), a determination is made as to whether the data blocks of the other volume are the same as the data blocks of the requested file. This process of determination may involve a request for metadata from the clustered computing network (e.g., to determine whether such metadata have changed since that file was last cached). For example, the client can compare the latest modification times for the file in the requested volume and the file in the other volume. If the latest modification times are the same for both files, the method can assume that the files are the same, even though they are associated with different volumes. The method could also look at other information in the inode structures to make this determination.

If the data blocks of the other volume are the same as the requested volume (YES at 918), then the method again progresses to 910 and the requesting module is provided with the data blocks of the file from client memory. If not (NO at 918), another volume can again be analyzed.

In 920, if no related volume is found to have the data blocks cached, the client requests the requested data from clustered computing network.

Although some illustrative methods and systems have been described above, it will be appreciated that these described methods and systems are only examples and other legal equivalents are contemplated as falling within the scope of this disclosure. For example, in some embodiments, a hash of a file (e.g., MD5 or SHA-1) can be attached to a file on a given volume. In this way, when the client analyzes its memory to determine whether a file as viewed from two different volumes is a bit-for-bit replica, the client can simply compare the hash to make a reliable determination as to whether the files are, in fact, the same.

In some embodiments, the clustered computing system can include a "junction" hierarchy capability, which allows access to a plurality of volumes using only a single explicit mount operation. A client can initiate the setup of a junction hierarchy by using a single mount operation to mount an initial volume. After this initial volume is mounted, other volumes can be added within the initial volume without requiring explicit mount commands. For example, if a client mounted an initial volume that included a root directory and two levels of directories below the root directory, by using a "junction" the user (or more specifically an administrator) could insert another volume into one of the two levels of directories below the root directory without explicitly mounting this other volume. In cases where a hierarchy of related volumes is wholly contained in, or co-extensive with, a junction hierarchy, the client side cache improvement over previous implementations may be even more apparent. It will be appreciated that while junctions may be discussed herein with regard to a certain number of levels of directories below an explicitly mounted point, that this is merely an example and done for purposes of illustration and ease of understanding, and that any suitable number of such levels are contemplated by the disclosure herein.

This added improvement in the case of junction hierarchies over previous implementations is due to the fact that the volumes in a junction hierarchy can all be stored on a single server or a group of related servers. In such an implementation, an administrator can specify a pattern (e.g., "SERVERNAME:/export/path/") that indicates whether the related volumes of a junction hierarchy are stored on the group of related servers. In some implementations, the hierarchy of related volumes is wholly contained within a junction hierarchy and thus the explicit mount operation uses a server-path which exactly matches the pattern specified by the administrator. That single pattern could be specified, in a preferred implementation, by some command as $ echo SERVERNAME:/export/path/>/proc/sys/clone-hierarchy-indicator.

In one implementation, the client OS would store the pattern in a data structure, and would disallow changes to this pattern once the first volume matching the pattern is mounted, or require that all such volumes be unmounted prior to changing the pattern, or discard all read-only cache entries for files under this path. In this manner, the client OS can track changes to a set of related volumes by effectively monitoring activity that occurs on a single server or group of servers specified by the pattern. The client then can more reliably determine if changes have been made to a file across different related volumes, thereby improving client-side cache hit ratios.

Although a node 102 is illustrated as a single unit in FIG. 1, it can have a distributed architecture. For example, the node 102 can be implemented with multiple distributed storage servers. In addition, the network module and data module within a node can be contained in separate housings and communicate with each other via network connections. Thus, the network module and the data module enable a storage server to be physically separated into multiple modules that can be distributed across a network.

A client can also be implemented in different ways, depending on the embodiment. For example, a client 700 may be a general purpose computing device, such as a desktop personal computer, configured to network with a node 102 within the clustered computing network.

It will be appreciated that processes, architectures and/or procedures described herein can be implemented in hardware, firmware and/or software. It will also be appreciated that the provisions set forth herein may apply to any type of special-purpose computer (e.g., file server, filer and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include hard drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data. Computer readable media may also comprise communication media, which typically embodies computer readable instructions or other data in a modulated data signal such as a carrier wave or other transport mechanism (e.g., that has one or more of its characteristics set or changed in such a manner as to encode information in the signal). The computer readable medium can also be distributed (e.g., using a switching fabric, such as used in computer farms) over a network-coupled computer system so that computer readable code is stored and executed in a distributed fashion.

Figure 10:
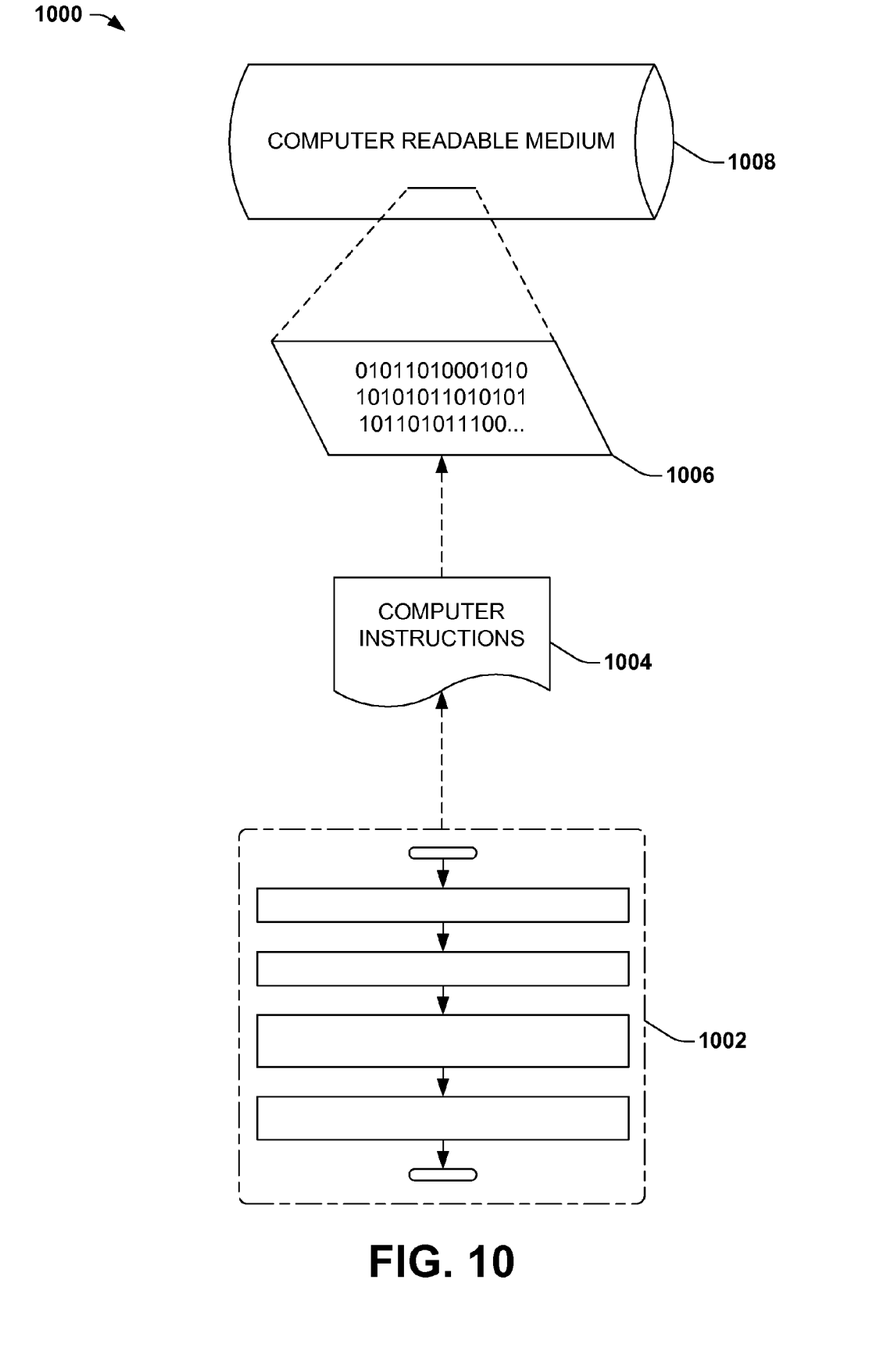
FIG. 10 is an example of a computer readable medium in accordance with one or more aspects of this disclosure.

Another embodiment (which may include one or more of the variations described above) involves a computer-readable medium comprising processor-executable instructions configured to apply one or more of the techniques presented herein. An exemplary computer-readable medium that may be devised in these ways is illustrated in FIG. 10, where the implementation 1000 comprises a computer-readable medium 1008 (e.g., a CD-R, DVD-R, or a platter of a hard disk drive), on which is encoded computer-readable data 1006. This computer-readable data 1006 in turn comprises a set of computer instructions 1004 configured to operate according to the principles set forth herein. In one such embodiment, the processor-executable instructions 1004 may be configured to perform a method, such as the method 800 of FIG. 8 or method 900 of FIG. 9, for example. Many such computer-readable media may be devised by those of ordinary skill in the art that are configured to operate in accordance with the techniques presented herein.

Moreover, unless specified to the contrary, the term "or" is intended to mean an inclusive "or" rather than an exclusive "or", and the articles "a" and "an" are generally to be construed to comprise "one or more". Furthermore, to the extent that the terms "includes", "having", "has", "with", or variants thereof are used, such terms are intended to be inclusive in a manner similar to the term "comprising".

What is claimed is:

1. A method for data retrieval, comprising:
   receiving a request for data identified as being stored within a first volume identified by a first volume identifier;
   determining whether the requested data is cached in client memory in association with the first volume identifier;
   if the requested data is not cached in the client memory in association with the first volume identifier, then determining whether the requested data is cached in the client memory in association with a second volume identifier, the second volume identifier identifying a second volume comprising a replication of the first volume; and
   if the requested data is cached in the client memory in association with the second volume identifier, then retrieving the requested data associated with the second volume identifier from the client memory.

2. The method of claim 1, comprising:
   if the requested data is not cached in the client memory, then requesting the requested data from the first volume.

3. The method of claim 1, the client memory comprised within a client device remote from a cluster computer network comprising at least one of the first volume and the second volume.

4. The method of claim 1, the second volume comprising a snapshot copy of the first volume.

5. The method of claim 1, the second volume comprising a flexible copy of the first volume.

6. The method of claim 5, the flexible copy based upon a snapshot copy of the first volume.

7. The method of claim 1, the retrieving the requested data associated with the second volume identifier from the client memory comprising:
   determining whether the requested data cached in the client memory in association with the second volume identifier is similar to the requested data stored within the first volume.

8. The method of claim 7, comprising:
   comparing a most recent modification time for the requested data cached in the client memory in association with the second volume identifier with a most recent modification time for the requested data stored within the first volume.

9. A system for data retrieval, comprising:
   a client device configured to:
      receive a request for data identified as being stored within a first volume identified by a first volume identifier;
      determine whether the requested data is cached in client memory in association with the first volume identifier;
      if the requested data is not cached in the client memory in association with the first volume identifier, then determine whether the requested data is cached in the client memory in association with a second volume identifier, the second volume identifier identifying a second volume comprising a replication of the first volume; and if the requested data is cached in the client memory in association with the second volume identifier, then retrieve the requested data associated with the second volume identifier from the client memory.

10. The system of claim 9, the client device configured to:
if the requested data is not cached in the client memory, then request the requested data from the first volume.

11. The system of claim 9, the client memory comprised within a client device remote from a cluster computer network comprising at least one of the first volume and the second volume.

12. The system of claim 9, the second volume comprising a snapshot copy of the first volume.

13. The system of claim 9, the second volume comprising a flexible copy of the first volume.

14. The system of claim 13, the flexible copy based upon a snapshot copy of the first volume.

15. The system of claim 9, the client device configured to:
determine whether the requested data cached in the client memory in association with the second volume identifier is similar to the requested data stored within the first volume.

16. The system of claim 9, the client device configured to:
compare a most recent modification time for the requested data cached in the client memory in association with the second volume identifier with a most recent modification time for the requested data stored within the first volume.

17. A computer readable storage media comprising computer executable instructions that when executed via a processor perform a method for data retrieval, comprising:
receiving a request for data identified as being stored within a first volume identified by a first volume identifier;
determining whether the requested data is cached in client memory in association with the first volume identifier;
if the requested data is not cached in the client memory in association with the first volume identifier, then determining whether the requested data is cached in the client memory in association with a second volume identifier, the second volume identifier identifying a second volume comprising a replication of the first volume; and
if the requested data is cached in the client memory in association with the second volume identifier, then retrieving the requested data associated with the second volume identifier from the client memory.

18. The method of claim 17, comprising:
if the requested data is not cached in the client memory, then requesting the requested data from the first volume.

19. The method of claim 17, the client memory comprised within a client device remote from a cluster computer network comprising at least one of the first volume and the second volume.

20. The method of claim 17, the second volume comprising at least one of a snapshot copy and a flexible copy of the first volume.

21. The method of claim 17, the retrieving the requested data associated with the second volume identifier from the client memory comprising:
determining whether the requested data cached in the client memory in association with the second volume identifier is similar to the requested data stored within the first volume.

22. The method of claim 21, comprising:
comparing a most recent modification time for the requested data cached in the client memory in association with the second volume identifier with a most recent modification time for the requested data stored within the first volume.

* * * * *